E. F. NELSON.
MANURE SCATTERER.
APPLICATION FILED OCT. 24, 1911.

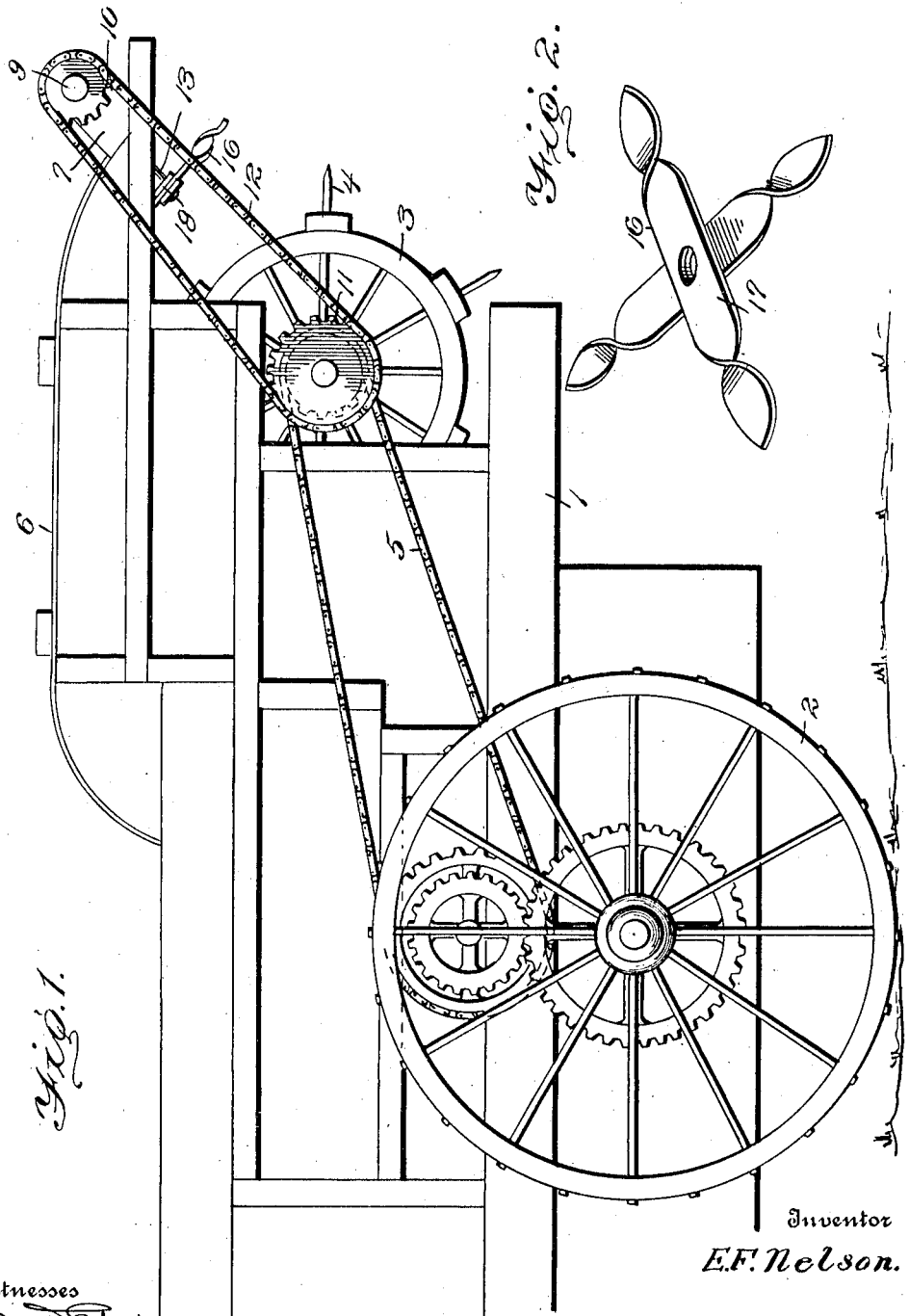

1,035,724.

Patented Aug. 13, 1912.
2 SHEETS—SHEET 2.

Inventor
E. F. Nelson

UNITED STATES PATENT OFFICE.

ELWYN F. NELSON, OF OSHKOSH, WISCONSIN, ASSIGNOR TO THE DAVIES THRESHING MACHINE COMPANY, OF OSHKOSH, WISCONSIN.

MANURE-SCATTERER.

1,035,724.

Specification of Letters Patent.

Patented Aug. 13, 1912.

Application filed October 24, 1911. Serial No. 656,411.

*To all whom it may concern:*

Be it known that I, ELWYN F. NELSON, citizen of the United States, residing at Oshkosh, in the county of Winnebago and State of Wisconsin, have invented certain new and useful Improvements in Manure-Scatterers, of which the following is a specification.

This invention relates to scatterers adapted to be applied to manure spreaders, and has for its object to provide a simple and an effective means for scattering material as it is deposited upon the ground.

The device is especially adapted to be used in combination with that type of manure spreader which is used at the rear end of a wagon body and which is operated from one of the wheels of the wagon, and which includes a rotatable drum or reel adapted to lift the material and cast the same upwardly and rearwardly as the wagon moves over the surface of the ground.

The present device includes a hood against which the material is cast and from which it rebounds upon a series of fans which are journaled for rotation upon axes at a right angle to the axis of the reel or drum of the spreader. When the material comes in contact with the blades of the scattering members it is deflected over the land directly to the rear and is cast in lateral directions with relation to the line of draft of the wagon. Thus the material is evenly spread behind the wagon and is not deposited in rows or large lumps.

Further objects and advantages will appear in the following description, it being understood that various changes in form, proportions and minor details of construction may be resorted to within the scope of the appended claims.

Figure 3:
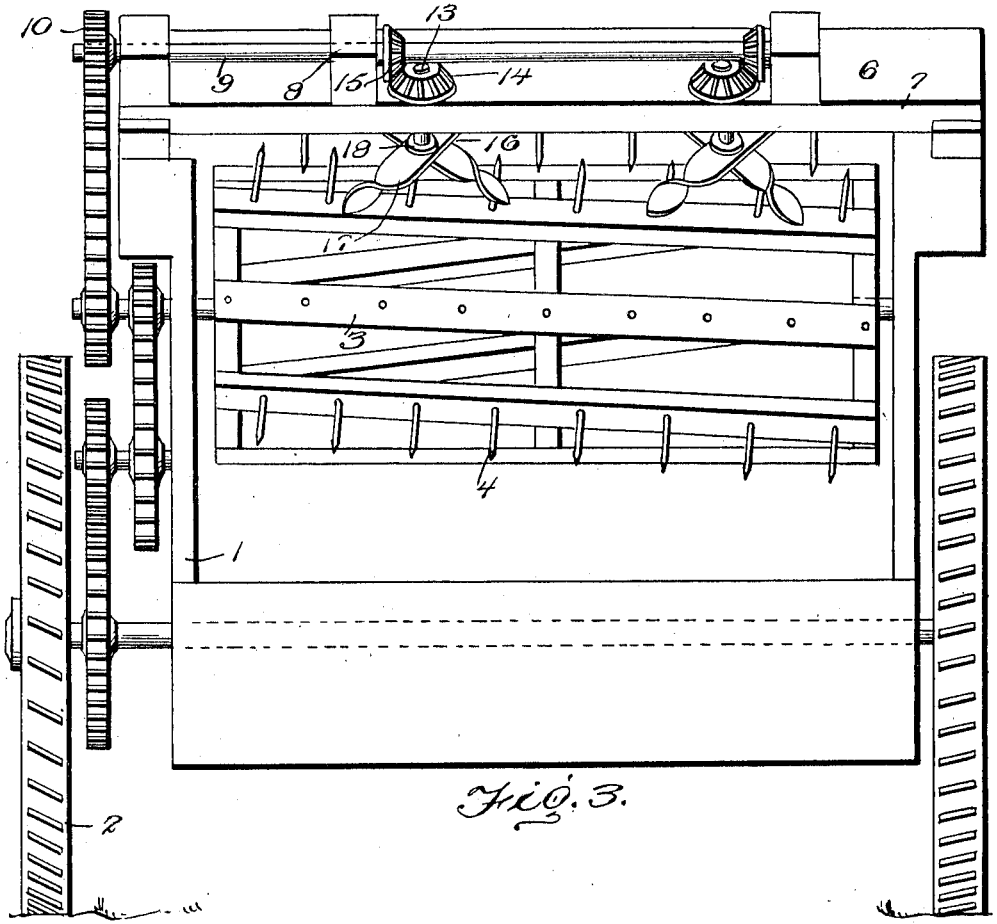
Figure 4:
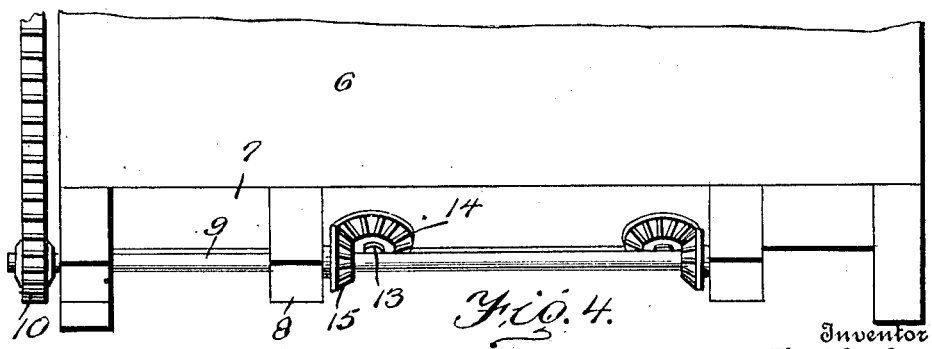

For a full understanding of the invention reference is to be had to the following description and accompanying drawings, in which:

Figure 1 is a side elevation of the rear portion of a spreader with the scatterer applied; Fig. 2 is a perspective view of one of the scattering members; Fig. 3 is a rear view of a spreader with the scatterer applied; Fig. 4 is a top plan view of a rear portion of the same.

Corresponding and like parts are referred to in the following description and indicated in all the views of the accompanying drawings by the same reference characters.

The manure spreader to which the scatterer is applied consists of a body 1 which is mounted upon rear wheels 2 and which is provided at its rear end with a journaled reel 3, having fingers 4. Any suitable means, as at 5, may be provided for rotating the reel 3 from one of the traction wheels 2. As these devices are of the usual pattern and arrangement and form no part of the present invention, further description of the same is deemed unnecessary.

A sheet metal hood 6 is located at the rear end of the body 1 over the reel 3 and the said hood is curved or concaved in a direction longitudinally of the body 1. A cross beam 7 is located at the rear end of the body 1 above the reel 3, and blocks 8 are mounted upon the upper side of the said beam 7. A shaft 9 is journaled for rotation in the blocks 8 and is provided at one end with a sprocket wheel 10. A sprocket wheel 11 is fixed to the shaft of the reel 3 and a sprocket chain 12 is trained around the sprocket wheels 10 and 11 and is adapted to transmit rotary movement from the shaft of the reel 3 to the shaft 9.

Stub shafts 13 are journaled in the beam 7 and are provided at their upper ends with beveled pinions 14. Beveled pinions 15 are fixed to the shaft 9 and mesh with the pinions 14. Scatterers 16 are fixed to the lower ends of the shafts 13 and are located below the beam 7 and below the lower surface of the hood 6, but above the rear portion of the reel 3.

Each scatterer 16 consists of blades 17 in cruciform arrangement, the said blades being secured at points intermediate their ends to hubs 18 which in turn are attached to the shafts 13. The portions of the blades 17 beyond the opposite sides of the hubs 18 are twisted so that the outer portions of the blades have the appearance of long screws or augers.

In operation, as the spreader is drawn over the surface of the ground, the reel 3 is rotated and the material in the body 1 is engaged by the fingers 4 and is cast upwardly and rearwardly against the under side of the hood 6. The material thus cast is deflected in a downward and rearward direction upon the upper surfaces of the blades 17 constituting the scatterers 16. Inasmuch as the shaft 9 is rotating as above described, rotary movement is transmitted through the intermeshing pinions 15, 14 and shafts 13 to the scatterers 16. Thus the material deposited upon the blades 17 is deflected laterally with relation to the line of draft of the spreader and is scattered upon the surface of the ground in the wake of the spreader.

Therefore it will be seen that a simple and an effective device is provided in combination with a manure spreader for scattering the material as it is deposited upon the surface of the ground behind the spreader.

Having thus described the invention, what is claimed as new is:

1. In combination with a spreader having a reel journaled for rotation and a hood located over the same, a scatterer located between the hood and the reel and arranged to receive material cast up by the reel on the rebound from the hood and cast the same behind the hood, and means for operating the scatterer.

2. In combination with a spreader having a journaled reel and a hood located over the reel, a scatterer located between the hood and the reel and journaled for rotation with its axis at a right angle to the axis of the reel, and means for rotating the scatterer.

3. In combination with a spreader having a journaled reel, and a hood located over the reel, a scatterer located between the hood and the reel, and means for rotating the scatterer, said scatterer having radially disposed blades in cruciform arrangement.

4. In combination with a spreader having a journaled reel, and a hood located over the reel, a scatterer located between the hood and the reel, and means for rotating the scatterer, said scatterer having blades with their end portions twisted.

In testimony whereof I affix my signature in presence of two witnesses.

ELWYN F. NELSON. [L. S.]

Witnesses:
 EDWARD J. DEMPSEY,
 GEORGE HILTON.

---

Copies of this patent may be obtained for five cents each, by addressing the "Commissioner of Patents, Washington, D. C."